US005115904A

United States Patent [19]

Folk et al.

[11] Patent Number: 5,115,904

[45] Date of Patent: May 26, 1992

[54] APPARATUS FOR ROTATING AN ELECTRICAL LEAD ABOUT ITS AXIS

[75] Inventors: Kenneth F. Folk; Phillip E. Loomis, both of Harrisburg; Michael A. Yeomans, Camp Hill, all of Pa.

[73] Assignee: AMP Incorporated, Harrisburg, Pa.

[21] Appl. No.: 691,281

[22] Filed: Apr. 25, 1991

[51] Int. Cl.[5] ............................................ B65G 47/24

[52] U.S. Cl. .................................... 198/403; 29/747; 29/748; 29/759; 198/411

[58] Field of Search ................ 29/747, 748, 759, 742; 198/403, 404, 411

[56] References Cited

U.S. PATENT DOCUMENTS 3,703,954 11/1972 Gudmestad ........................ 198/179
3,858,292 1/1975 Gudmestad .................... 29/203 DT

*Primary Examiner*—Carl E. Hall

[57] ABSTRACT

Apparatus for rotating an electrical lead through an angle of 180 degrees comprises a frame in surrounding relationship to a conveyor clamp in which the lead is held, rotating assemblies and a control system. The rotating assemblies are in alignment with each other and on each side of the conveyor clamp, and are movable from a remote position to a proximate position relative to the conveyor clamp. The rotating assemblies contain rotating clamps. The control system releases the lead from the conveyor clamp simultaneously with closure of the rotating clamps in the rotating assemblies. After rotation of the rotating assemblies, the lead is released by the rotating clamps and the conveyor clamp is closed to grip the lead in its rotated orientation.

12 Claims, 14 Drawing Sheets

5115904

APPARATUS FOR ROTATING AN ELECTRICAL LEAD ABOUT ITS AXIS

FIELD OF THE INVENTION

This invention relates to apparatus for rotating an electrical lead, which is held in a clamp on a conveyor, about its axis so that the terminal on the end of the lead is properly oriented for insertion into a connector housing.

BACKGROUND OF THE INVENTION

A widely used type of lead making machine comprises a conveyor having lead holding clamps at spaced apart locations thereon. Electrical leads are supplied from an endless source of wire and placed in the clamps at a loading station. The ends of the leads are presented to crimping presses which are located on the path of movement of the conveyor and terminals are crimped onto the ends of the leads. Lead making machines of this type are shown, for example, in U.S. Pat. Nos. 3,858,292 and 3,703,954, which are hereby incorporated by reference into this description.

It is common practice to provide a terminal inserter, or block loader, adjacent to the conveyor of a conveyor-type lead making machine for inserting the terminals on the ends of the leads produced into the terminal receiving cavities of an electrical connector. Many types of terminals must be in a specific orientation when they are inserted into the cavity of a connector housing for the reason that the terminal may have a retention lance extending therefrom and is nonsymmetrical about one or both axes. The terminal must be oriented so that the lance on the terminal will engage a shoulder in the cavity when the terminal is inserted into the cavity. Quite frequently, the terminals are crimped onto the ends of the lead wires in an orientation which is not the proper orientation for the terminal insertion operation which is subsequently carried out. It is therefore necessary to reorient the lead prior to insertion by rotating it about its axis through a predetermined angle, usually 180 degrees, prior to the block loading or terminal insertion operation. The present invention is directed to the achievement of an apparatus which is intended for use on a conveyor-type lead making machine which is capable of rotating an electrical lead about its axis so that it will be in the proper orientation for insertion.

THE INVENTION

The invention comprises an apparatus for rotating an electrical lead about its axis through a predetermined angle. The lead has a terminal on its end and is gripped by a conveyor clamp which is mounted on an intermittently indexed conveyor. .The apparatus comprises frame means in surrounding relationship to the conveyor clamp, first and second lead rotating assemblies, and control means. The rotating assemblies are in alignment with each other and are movable on the frame means in unison between remote positions and proximate positions relative to the conveyor. The rotating assemblies are on each side of the conveyor and in alignment with the conveyor clamp when they are in their proximate positions. Each of the rotating assemblies has a normally open rotating clamp thereon and each rotating assembly is rotatable about a common axis of rotation which extends normally of the conveyor and through the clamps. The control means is effective sequentially to move the rotating assemblies from their remote positions to their proximate positions at the beginning of a dwell interval of the conveyor. The control means thereafter opens the conveyor clamp and closes the rotating clamps, rotates the rotating assemblies through the predetermined angle, closes the conveyor clamps and opens the rotating clamps, rotates the lead rotating assemblies back to their original angular orientations, and moves the rotating assemblies to their remote positions. Thereafter, the conveyor is indexed. During a complete operating cycle, the lead is released by the conveyor clamp, gripped by the rotating clamps, rotated through the predetermined angle, released by the rotating clamps, and gripped by the conveyor clamp in its rotated orientation.

Each of the lead rotating assemblies comprises a housing assembly, a clamp controller, and housing assembly rotating means. The housing assembly is rotatably supported on the axis of rotation and the rotating clamp is on the housing assembly. The rotating clamp has clamping jaws which are proximate to the axis of rotation and the jaws are movable relatively towards and away from each other between open and closed positions. The clamp controller is mounted on the housing assembly and is movable between a jaws closed position and a jaws open position. The jaws are coupled to the controller whereby upon movement of the controller from its jaws open position to its jaws closed position, when the lead is located on the axis of rotation, the lead will be clamped in the jaws. Upon rotation of the housing assembly by the rotating means, the lead will be rotated and upon subsequent movement of the controller to its jaws open position, the lead will be released in the rotated orientation.

THE DRAWING FIGURES

FIG. 3 is a frontal view of an apparatus in accordance with the invention mounted on a conveyor-type leading making machine, this view showing the positions of the parts when the lead rotating mechanisms are in their raised or remote positions relative to the conveyor chain.

Figure 6:
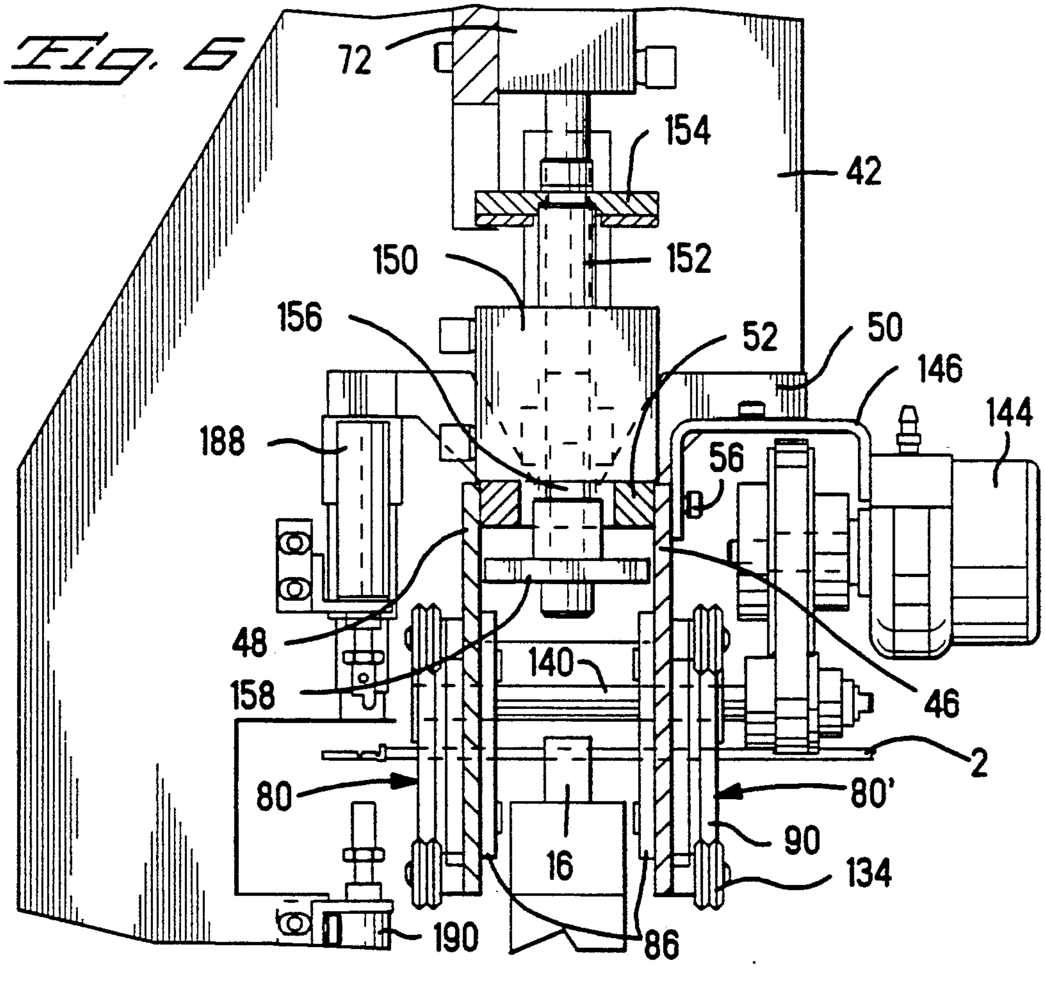
Figure 4:
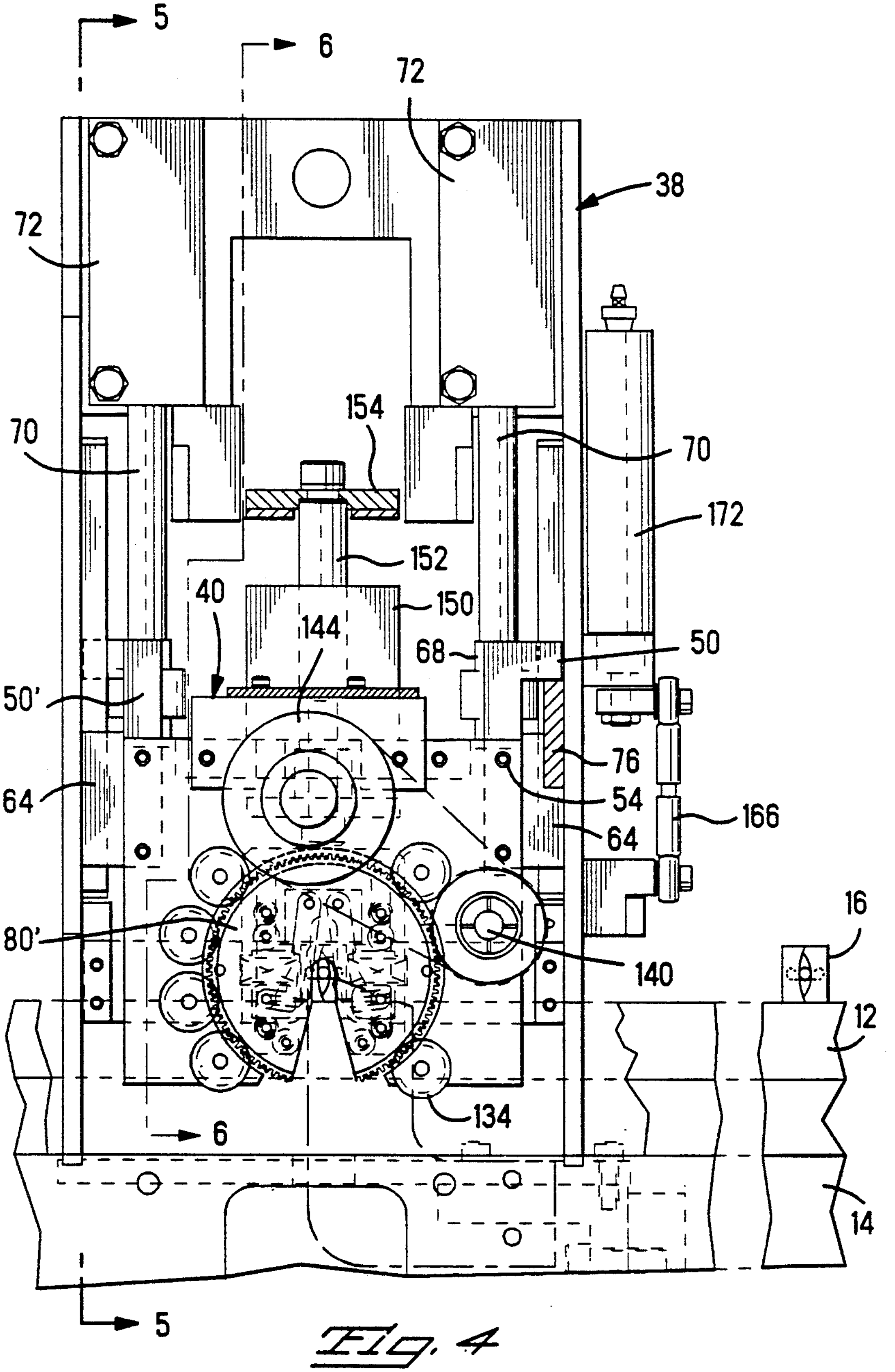
FIG. 4 is a view similar to FIG. 3 showing the positions of the parts when the rotating assemblies are in their lowered positions.
Figure 5:
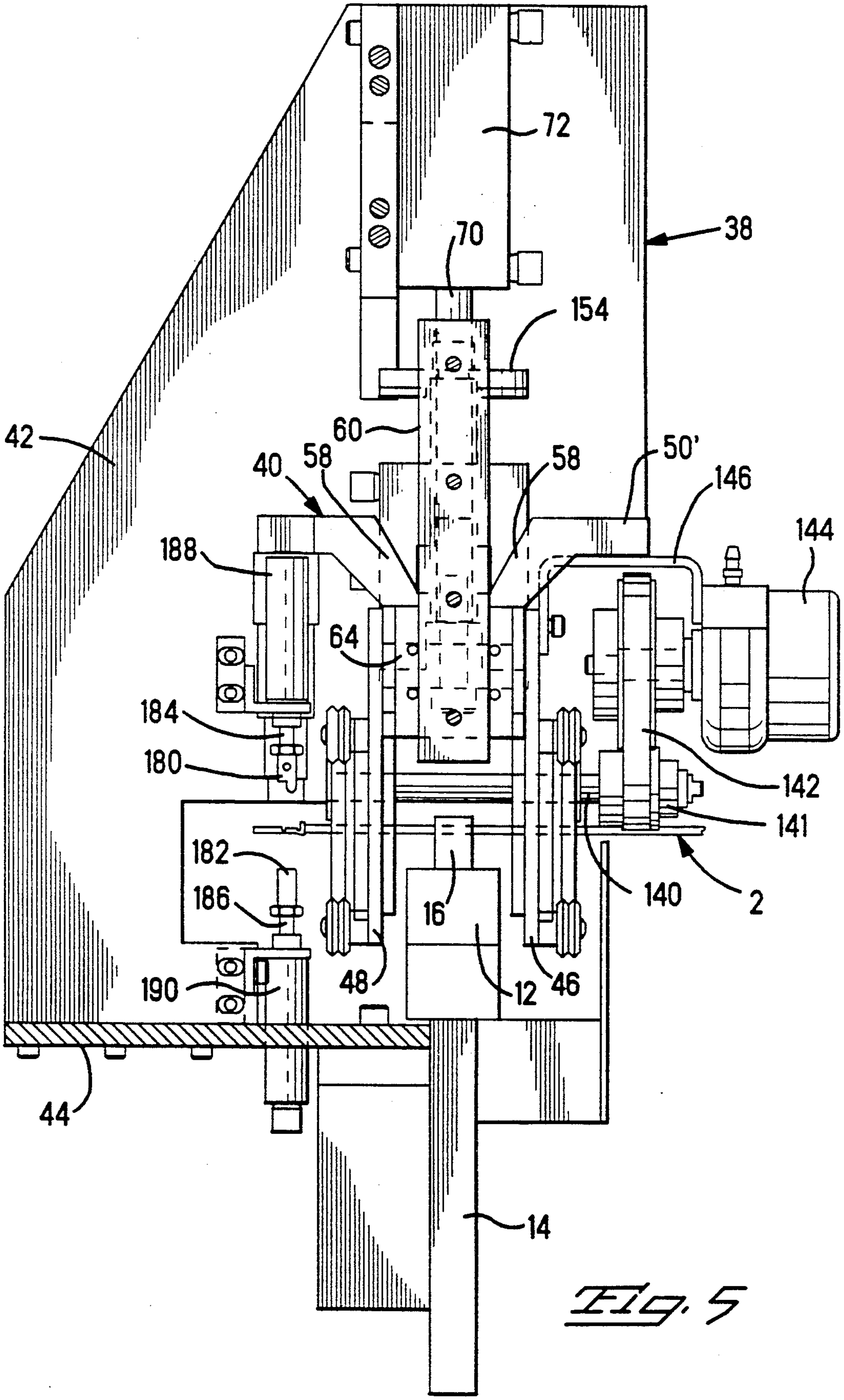
Figure 7:
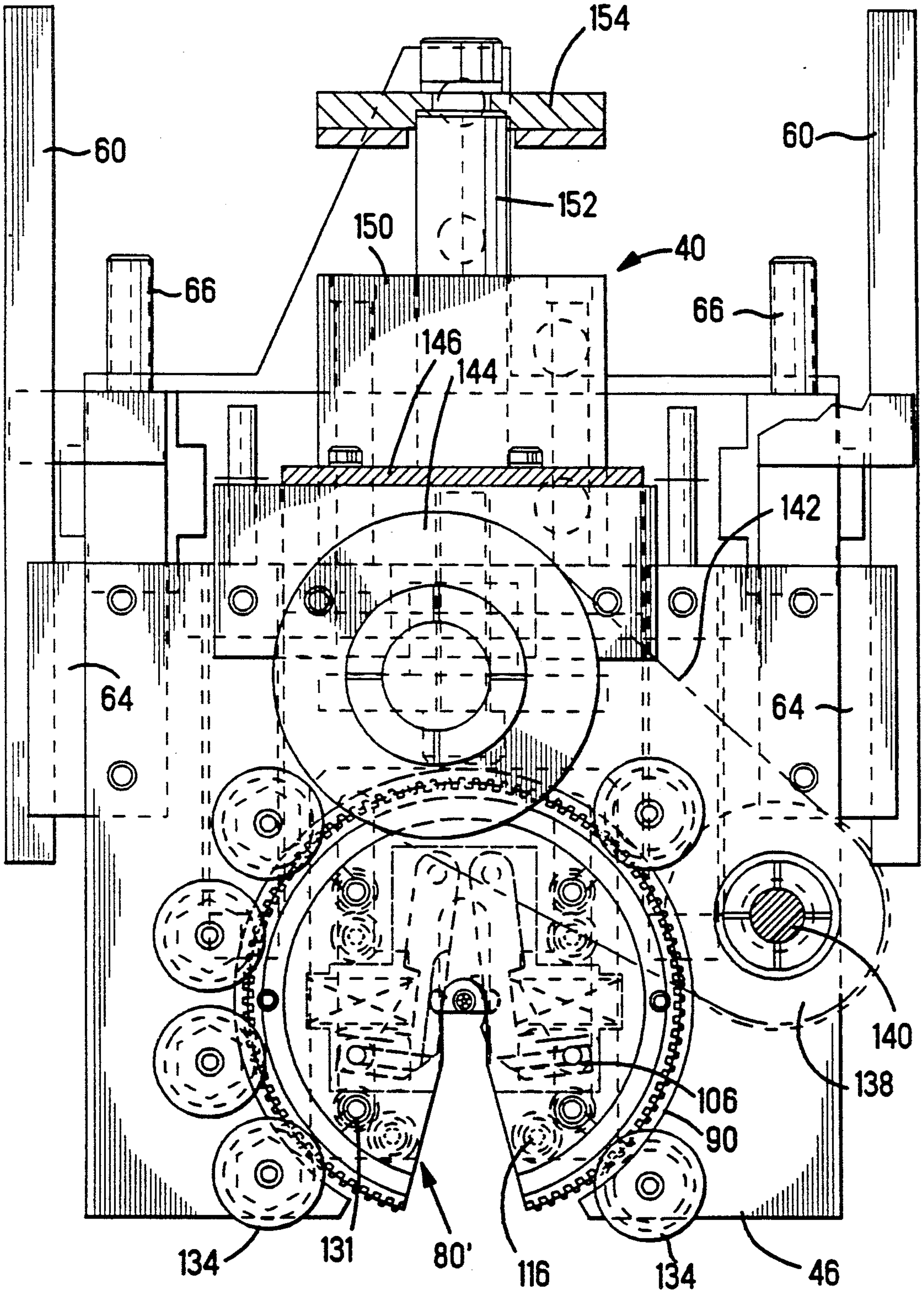

FIGS. 5 and 6 are sectional views looking in the direction of the arrows 5—5 and 6—6 of FIG. 4.

Figure 7:
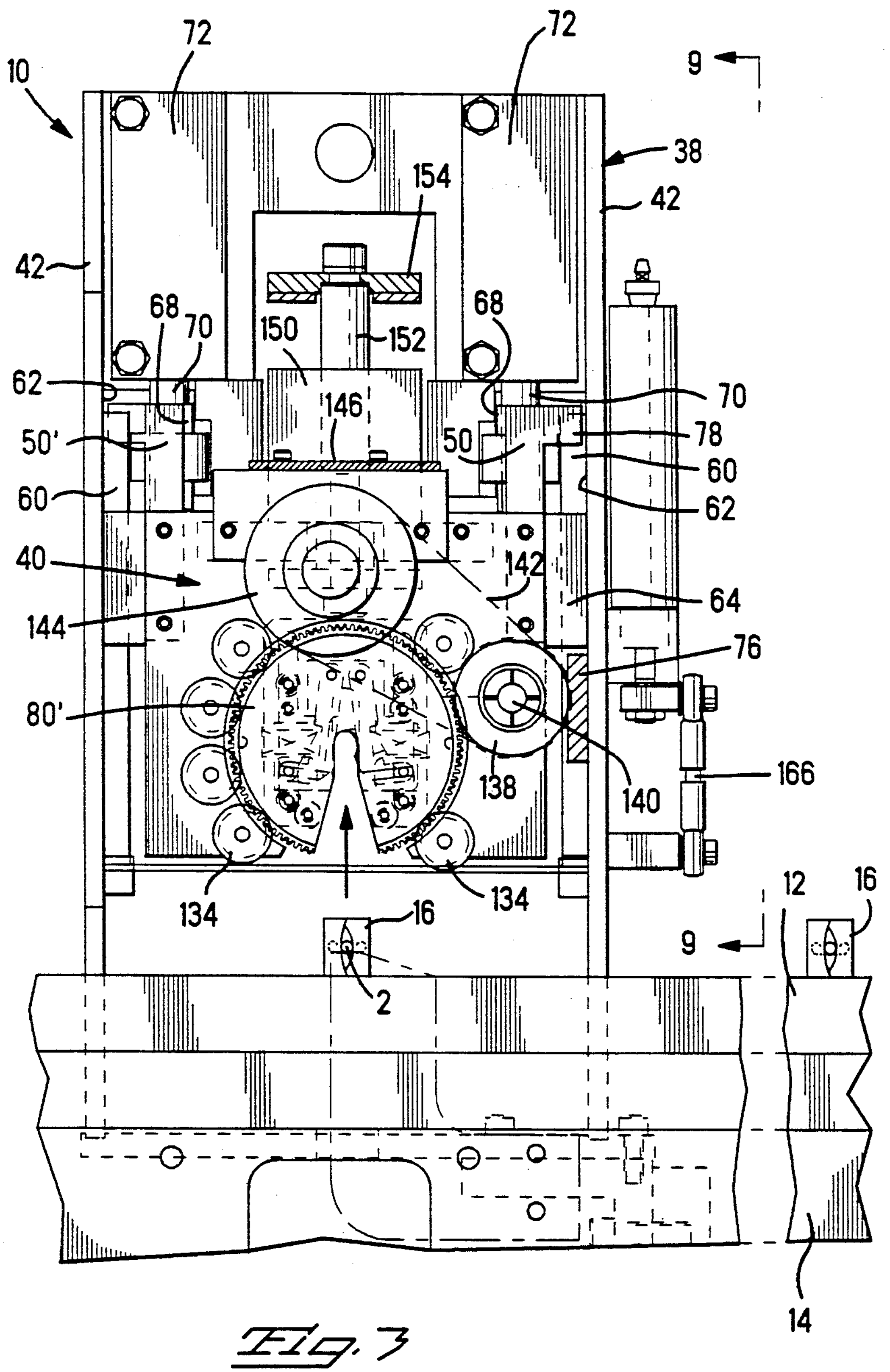

FIG. 7 is a frontal view of the sub-frame portion of the apparatus on which the lead rotating assemblies are carried, this view showing the positions of the parts prior to rotation of the lead rotating assemblies.

Figure 8:
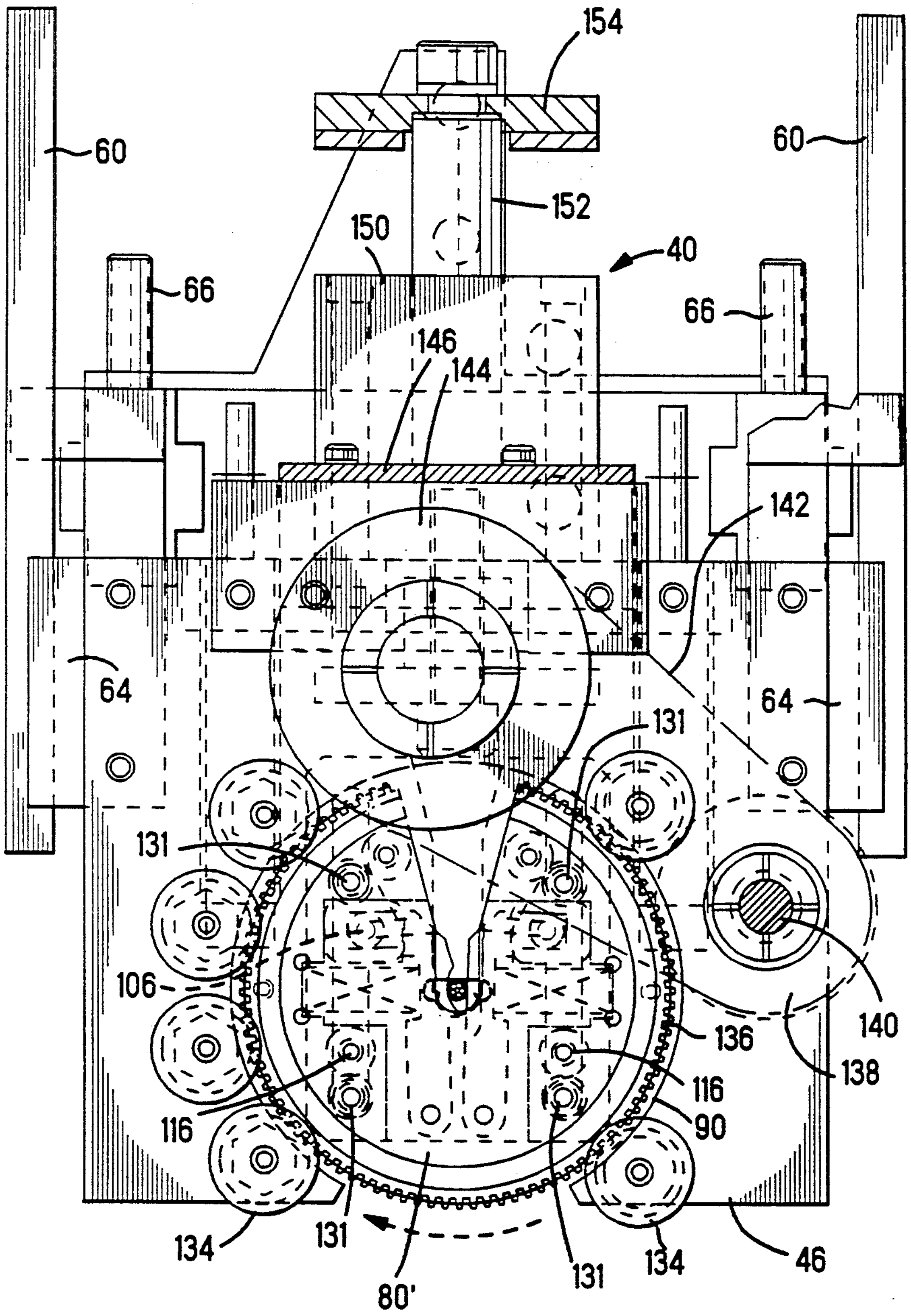

FIG. 8 is a view similar to FIG. 7 showing the lead rotating assemblies in their rotated positions.

Figure 9:
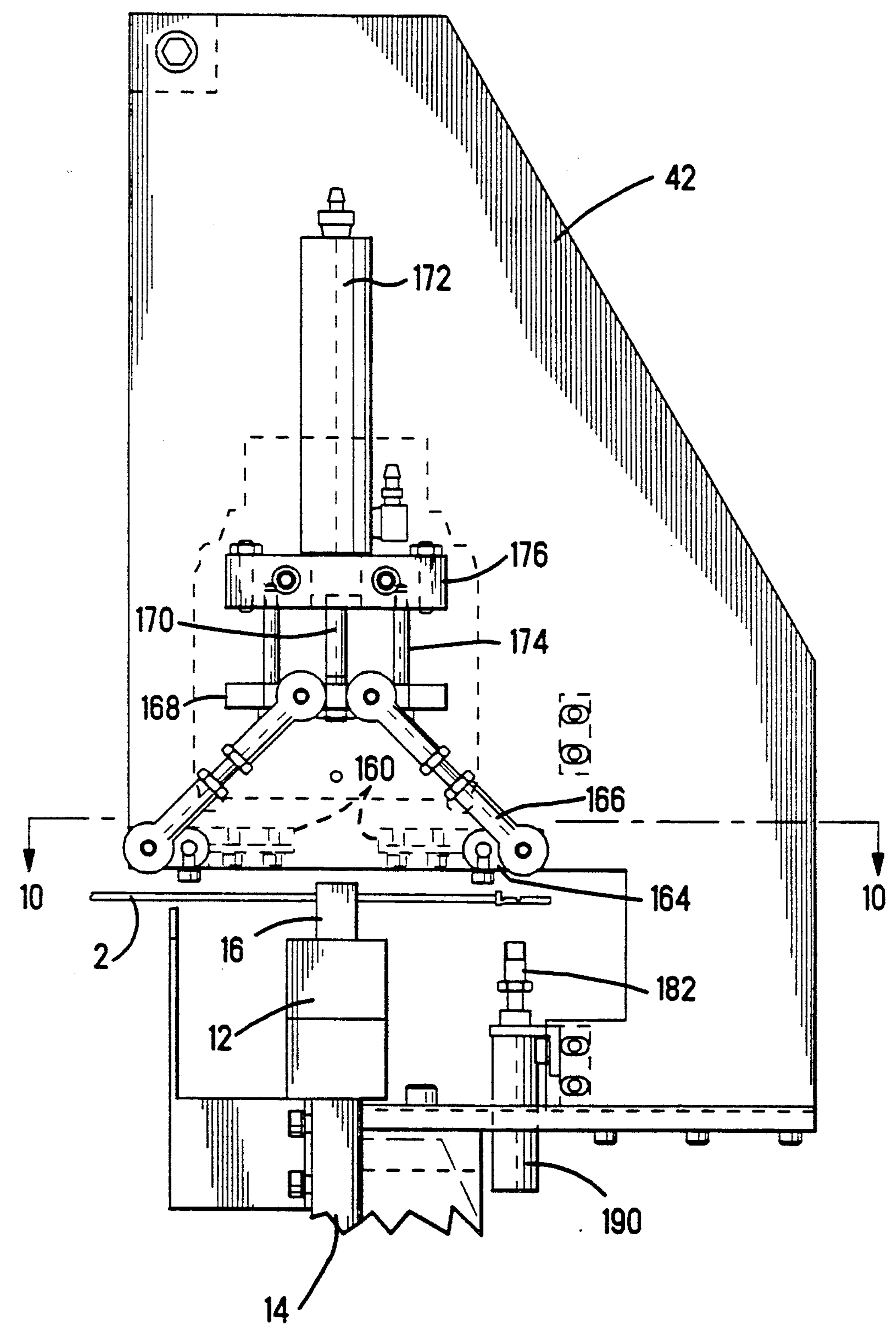

FIG. 9 is a side view looking in the direction of the arrows 9—9 of FIG. 3 showing a pair of wire combs.

Figure 10:
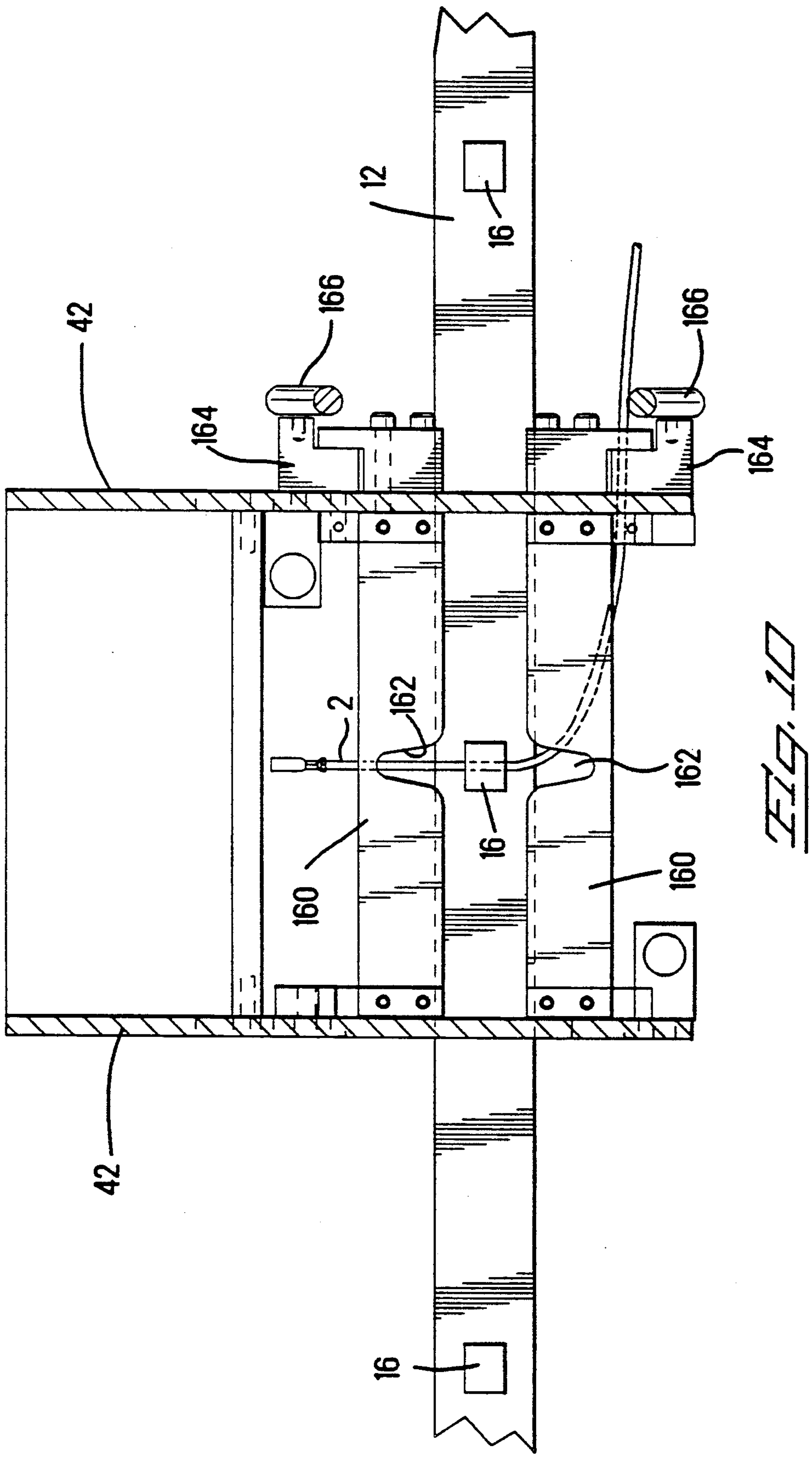

FIG. 10 is a sectional view looking in the direction of the arrows 10—10 of FIG. 9.

Figure 11:
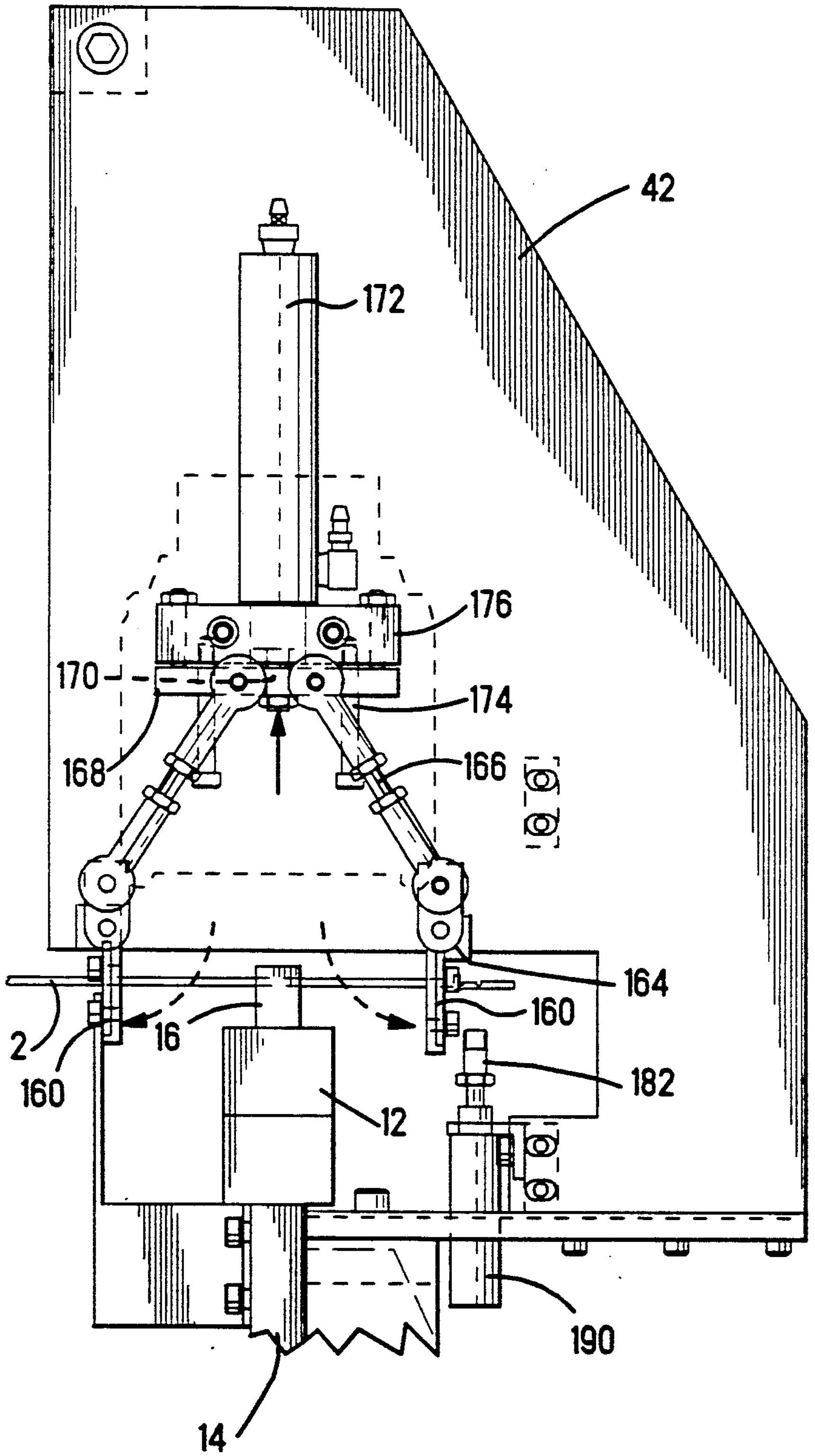

FIG. 11 is a view similar to FIG. 9 but showing the positions of the parts after the wire combs have straightened portions of the lead which is to be rotated.

Figure 12:
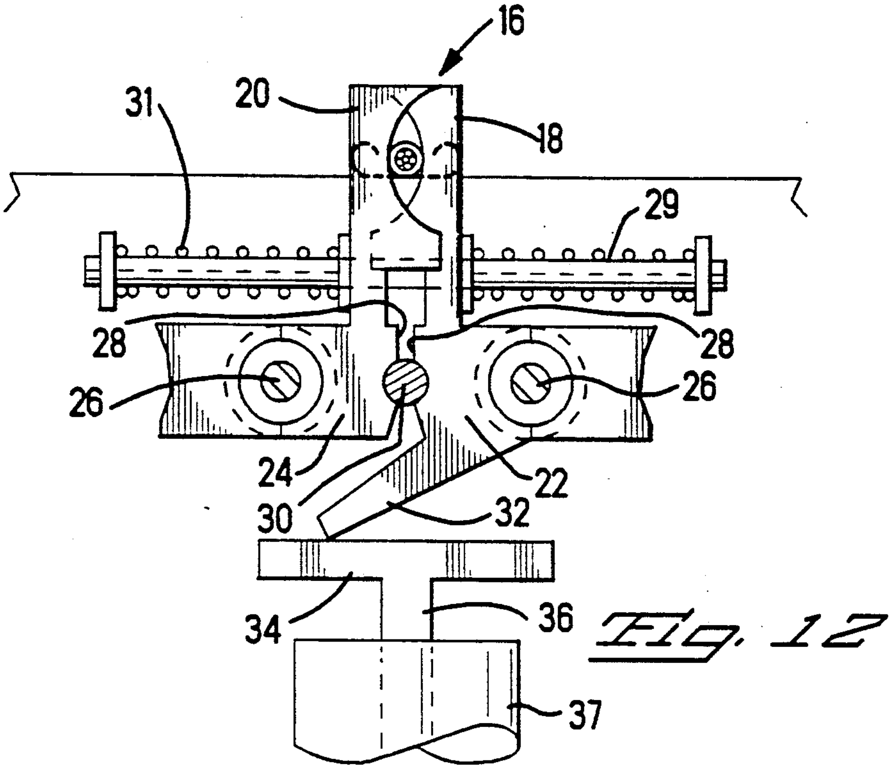
Figure 13:
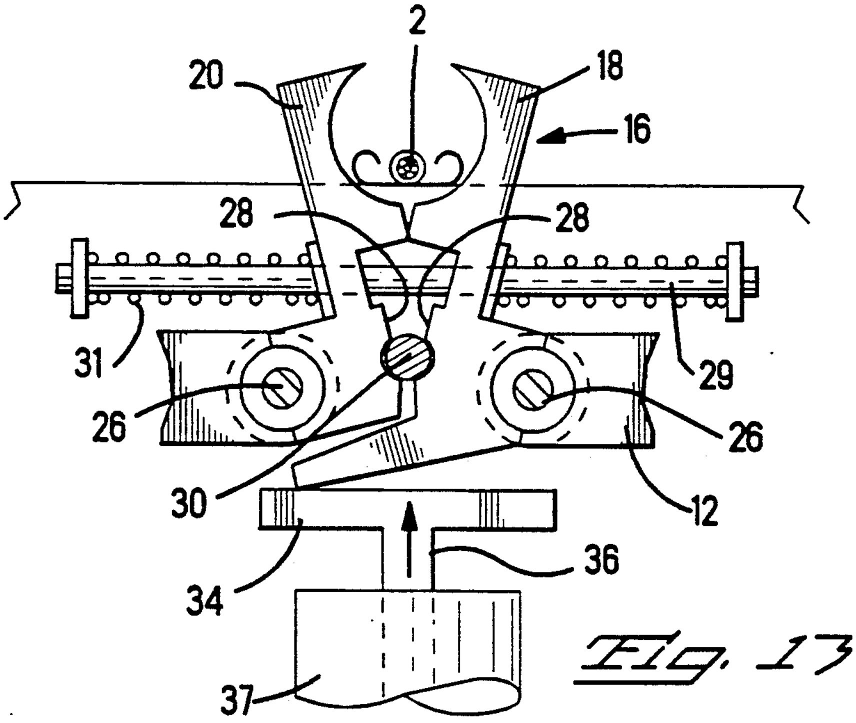

FIGS. 12 and 13 are enlarged fragmentary views showing details of a conveyor clamp.

Figure 14:
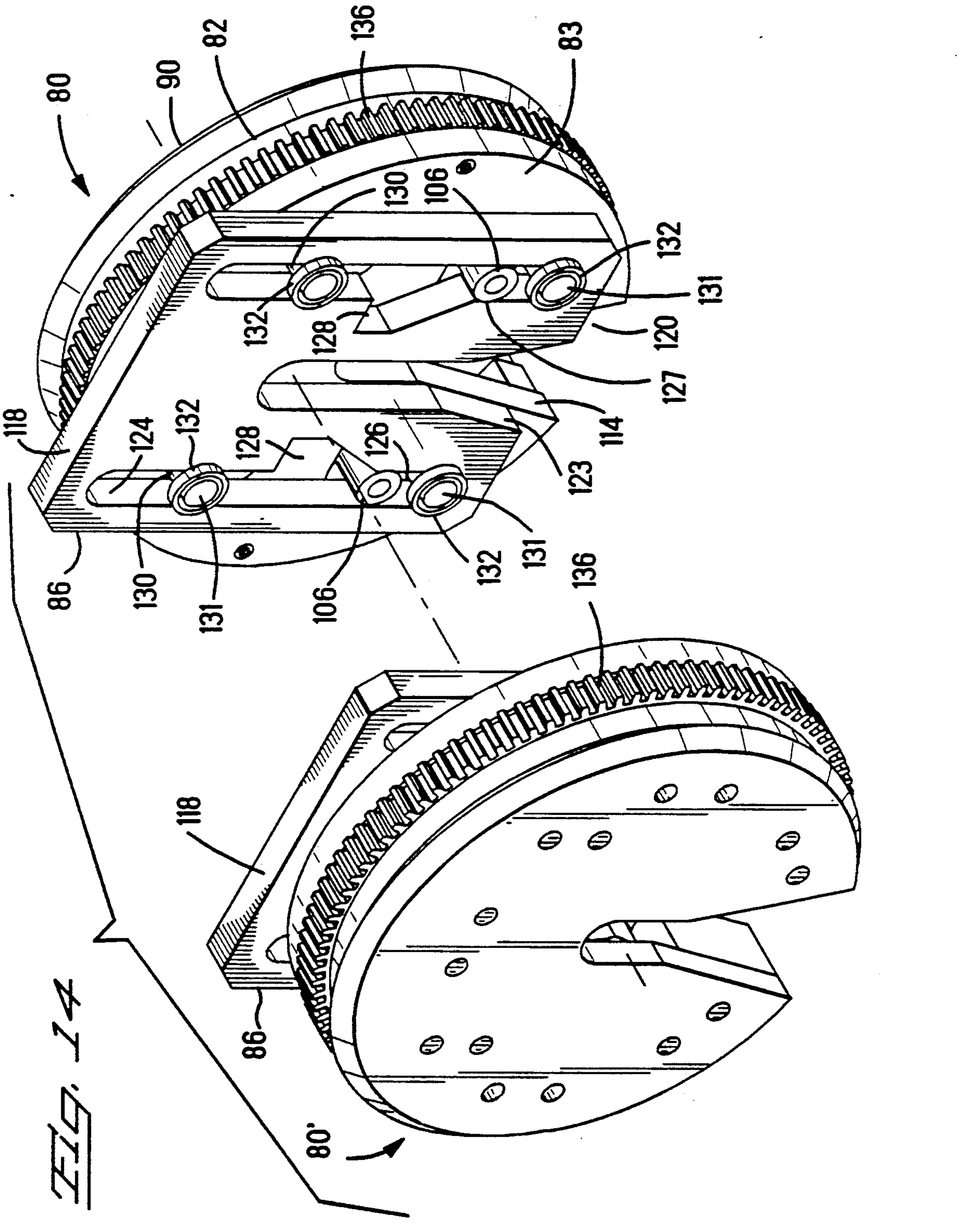

FIG. 14 is a perspective view of the two rotating assemblies.

Figure 15:
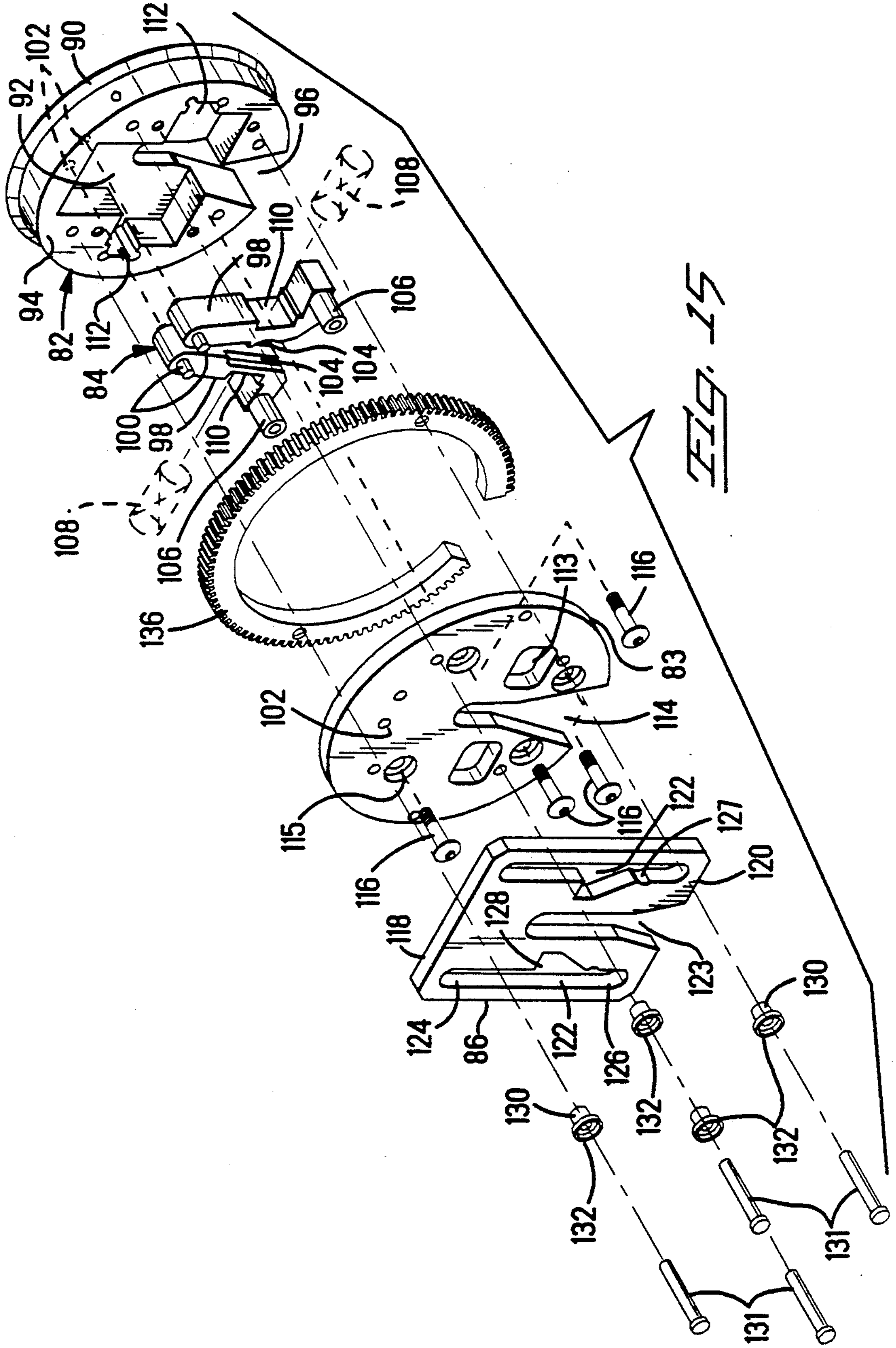

. FIG. 15 is a perspective exploded view showing the parts of one of the rotating assemblies.

Figure 16:
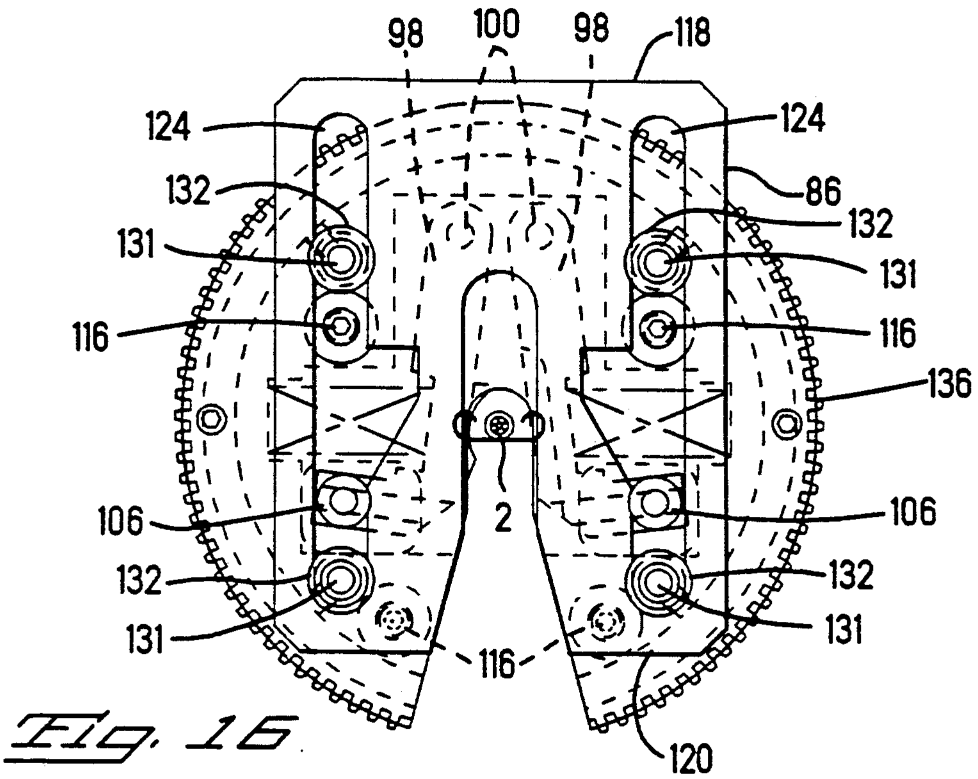

FIG. 16 is a frontal view showing a rotating assembly with the clamping jaws in their open position.

Figure 17:
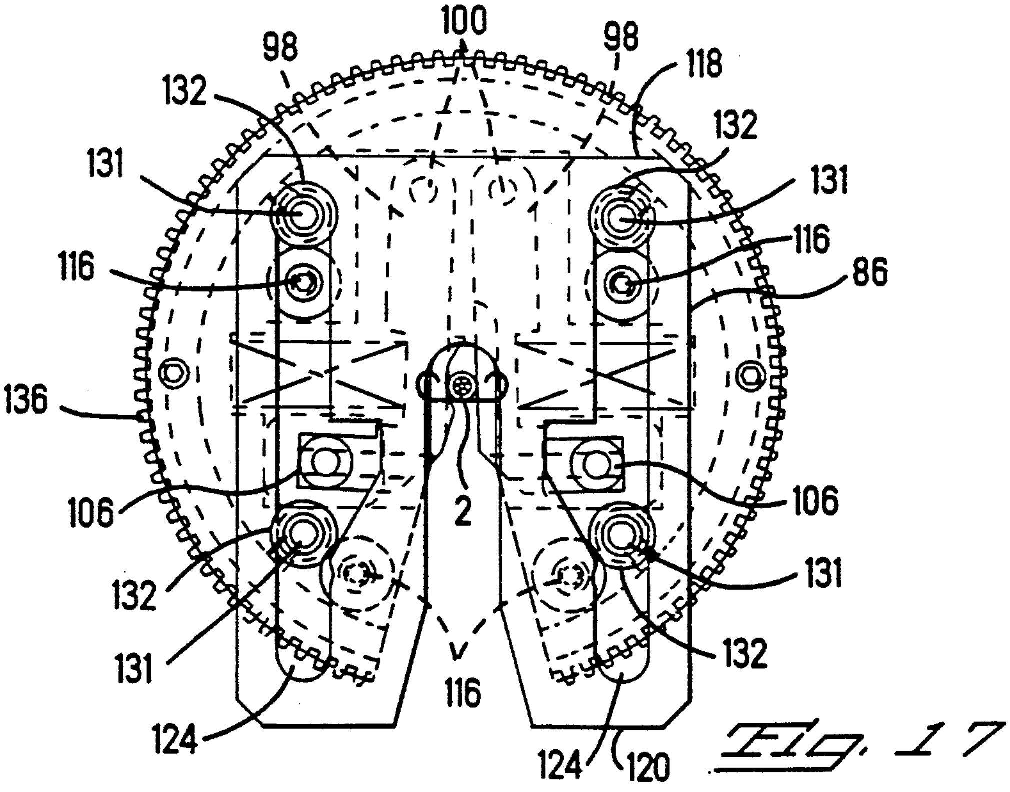

FIG. 17 is a view similar to FIG. 16 but showing the clamping jaws in their closed positions.

Figure 18:
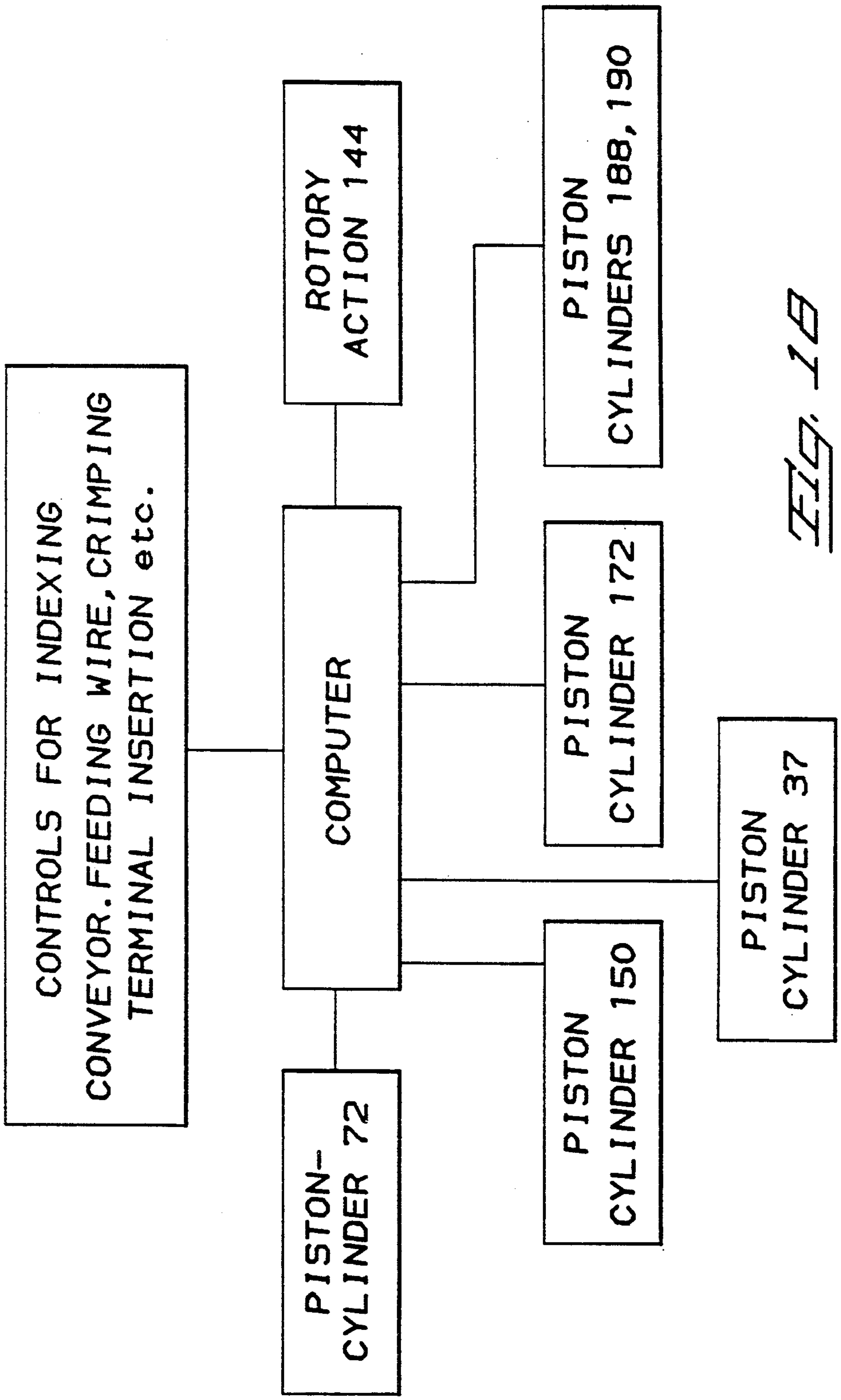

FIG. 18 is a block diagram of a control system.

THE DISCLOSED EMBODIMENT

Figure 1:
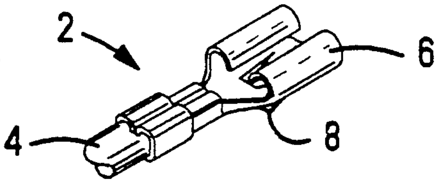
FIGS. 1 and 2 are views showing a portion of an electrical lead in two different orientations.

FIG. 1 shows an electrical lead 2 which comprises a wire 4 having a terminal 6 on its end. The lead is shown in FIG. 1 with a lance 8 on he terminal on the underside of the terminal. Ordinarily, the lead will be produced by the crimping machine in this orientation because of the fact that the U-shaped crimp portion of the terminal is directed upwardly prior to crimping, and the wire is moved downwardly into the U-shaped crimped portion.

Figure 2:
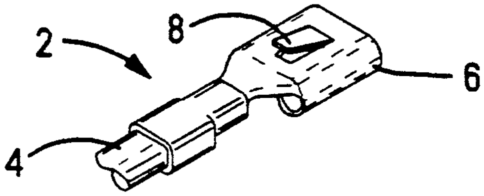

When a terminal insertion apparatus is mounted on the lead making machine, it is sometimes necessary to rotate the lead 2 through an angle of 180 degrees so that its orientation is as shown in FIG. 2 with the lance 8 on the upper side of the terminal. This reorientation of the terminal is necessary for the reason that the lance 8 engages a shoulder in the connector housing into which the terminal is inserted and in some instances, the shoulder will be located such that reorientation of the terminal is required. The present invention comprises an apparatus which can be mounted on the conveyor-type lead making machine for reorienting the electrical lead as shown in FIGS. 1 and 2.

The conveyor-type lead making machine has a conveyor chain 12, FIGS. 3, 5, and 9, which is supported on a conveyor frame 14. Clamps 16 are mounted on the conveyor chain 12 at spaced-apart intervals. Each clamp, FIGS. 12 and 13, comprises a pair of clamping arms 18, 20 having lower end portions 22, 24 which extend laterally parallel to the conveyor chain and which are pivoted to adjacent pins of the chain as shown at 26. The opposed arms have surfaces which function as lead gripping jaws and the arms are resiliently biased to their closed positions as shown in FIG. 12 by springs 31 which are mounted on a rod 29 that extends through oversized aligned openings in the arms. The lower portion 22 of the arm 18 has a laterally and obliquely extending lever arm 32. The opposed edges 28 of the clamping arms have a roller bearing 30 therebetween so that when the lever arm 32 is pushed upwardly, the arms will be moved apart thereby releasing the wire.

The invention requires that the lead be released by the conveyor clamp for a brief interval and such release of the lead is achieved by the piston rod 36 of a pneumatic cylinder 37 which is mounted on the conveyor frame and which has an enlarged end 34. Upward movement of the piston rod will swing the lever 32 in a clockwise direction thereby causing the clamping arms 18,20 to move apart, see FIG. 13.

The lead rotating apparatus 10, FIGS. 3–11, comprises a main static frame 38 and a movable sub-frame 40. The main static frame 38 comprises spaced-apart vertical side plates 42, a base plate 44, an additional transverse members which extend between the side plates as shown in the drawing. Static frame 38 is fixed in the position shown in FIG. 3 in surrounding relationship to the conveyor clamp 16 which holds the lead which is to be rotated.

The movable sub-frame 40 comprises front and rear frame plates 46,48 which extend transversely of side plates 42, parallel support members 50,50′, and a spacer 52. The support members 50,50′ extend parallel to, and are spaced inwardly from, the side plates 42. The support members are secured by fasteners 54,56 to the plates 46,48 and to the spacer block 52. The support members 50,50′ have downwardly inclined portions 58 as shown in FIG. 5.

Sub-frame 40 is moved vertically between the positions of FIGS. 3 and 4 by piston rod 70 of piston cylinders 72 which are mounted on the opposed surfaces 62 of side plates 42. The piston rods are coupled by couplings 68 to rods 66 which are integral with the sub-frame 40. Sub-frame 40 is guided during vertical movement by rails 60 which are mounted on the opposed surfaces 62 of side plates 42 and bearing 64 which are mounted on the sub-frame.

It is desirable to provide dampers or shock absorbers (not shown) on the frame 38 to cushion the downward and upward movement of the sub-frame. The extent of downward movement of the sub-frame is limited by fixed stops 76 on the static frame and movable stops 78 on the sub-frame 40. These movable stops are integral with the support members 50,50′.

Referring now to FIGS. 14–17, the lead is rotated by a pair of rotating assemblies 80,80′, rotating assembly 80′ is mounted on the front frame plate 46 and the assembly 80 is mounted on rear frame plate 48. These two rotating assemblies are identical to each other and are in back-to-back relationship as shown in FIG. 14. Only the rotating assembly 80 is described below.

The rotating assembly 80 comprises a housing 82, a clamping assembly 84, a clamp controller 86, and rotating means which are described below. The housing 82 is relatively thin cylindrical member having a peripheral lip 90 which is V-shaped in cross section and having a contoured recess 92 on its face 94 against which a cover plate 83 is secured. A notch 96 extends inwardly from its periphery and intersects the axis of rotation. The clamping assembly 84 comprises a pair of clamping arms 98 which are pivotally mounted on parallel spaced-apart axes by pivot pins 100 which are received in holes 102 in the housing 82 and the cover plate 83. The opposed surfaces of these clamping arms function as clamping jaws 104. The lower portions of the arms have cam follower pins 106 extending therefrom parallel to the pivot pins 100. Springs 108 bear against intermediate portions 110 of the arms to bias the arms to their closed, or clamping, positions. These springs are received in pockets 112 in the recess 92.

The cover plate 83 is provided with a notch 114 which is in alignment with notch 96 and is secured by screws 116, which extend through openings 115, into the face 94 of the housing body. Openings 113 are provided in this cover plate for cam followers 106.

The controller 86 is in the form of a camming plate having upper and lower edges 118,120 as viewed in FIGS. 15 and 16, a wire receiving notch 123 which is in alignment with the previously noted notches 96,114, and contoured openings 122 on each side of the notch. Each opening has an upper narrow slot-like portion 124, a lower relatively narrow slot-like portion 126, and an intermediate enlarged portion 128. The slot-like portions 124, 126 have a width which receives the cam followers 106 on the clamping arms. The enlarged portions 128 permit arcuate movement of the cam followers when the jaws are opened and closed. Arcuate recesses 127 are provided in the lower slot-like portions 126 and function as detents for retaining the cam followers 106 in the positions shown in FIG. 16. The camming plate 86 is retained against the surface of the cover plate 83 by rollers 130 which are received in the slots 124,126 and which have enlarged heads 132. The rollers 130 are rotatably supported on pins 131 which extend through holes in cover plate 83 and into body 82. Set screws (not shown) secure pins 131 to body 82.

The rotating assemblies 80,80' are rotatably supported on the movable frame plates by means of grooved rollers 134 which are mounted on the plates 46,48 and which surround the rotating assemblies and receive the lip 90.

The lead rotating assemblies are rotated through an angle of 180 degrees between the positions of FIGS. 16 and 17 by means of a gear sector 136 on each rotating assembly which is mounted on the housing 82 and which is in mesh with gears 138 that are rotatably mounted on a shaft 140. The shaft 140 is coupled by a pulley 141 and belt 142 to a pneumatic rotary actuator 144 mounted on the front frame plate 46 by means of a bracket 146.

During each operating cycle, the camming plate 86 is moved from the position of FIG. 16 to the position of FIG. 17 and, after the rotating assembly has been rotated through an angle of 180 degrees, the camming plate must be moved back to its original position. This movement of the camming plate is achieved by a double-acting cylinder 150 having a piston rod which extends above the cylinder and below the cylinder. The upper portion 152 of the piston rod has a stop 154 thereon to limit its downward movement, and the lower portion 156 has a plate 158 thereon which engages either of the edges 118,120 of the camming plates 86. The piston cylinder, 150 is mounted on the sub-frame 40 and is adjacent to, and immediately above, the rotating assemblies, see FIG. 6.

The operation of the apparatus is as follows. At the beginning of an operating cycle, the conveyor chain 12 will have been indexed and a conveyor clamp 16 will be located immediately beneath the rotating assemblies. The movable sub-frame is in its raised position, FIG. 3, and is first lowered to the position of FIG. 4 so that the lead held in the conveyor clamp extends through the aligned notches in the two rotating assemblies. The lead is released from the conveyor clamp by the piston rod 36, as shown in FIGS. 12 and 13. The piston rod 36 is moved upwardly from its position in FIG. 12 causing the lever 32 to swing through a clockwise arc and open the clamping arms against the biasing force of the springs 31.

Substantially simultaneously, the piston rod in the piston cylinder 150 is moved downwardly thereby moving the camming plate 86 downwardly from the position of FIG. 16 to the position of FIG. 17. When the camming plate is moved downwardly as viewed in FIGS. 16 and 17, the cam followers 106 move relatively out of the recesses 127 in the lower slot portions 126 and into the enlarged central portions 128 of the openings in the camming plate. The springs then cause the clamping arms 98 to move into their closed positions so that the lead is gripped by the lead rotating assemblies 80,80'. The rotating assemblies are then rotated through an angle of 180 degrees so that they are in the positions shown in FIG. 8. After the rotating assemblies have been rotated to the positions of FIG. 8, the cylinder 150 is again pressurized to move the clamping plate 86 back to its original position and release the rotated lead from the clamping assembly in the rotating mechanisms. At the same time, the conveyor clamp is closed to grip the rotated lead in its new orientation. The rotating assemblies 80,80' are then rotated back to the positions of FIG. 7 and the sub-frame 40 is returned to the position of FIG. 3.

The piston cylinder 150 is double-acting and the control system is programmed to pressurize the lower end of the cylinder immediately after the piston rod 152,156 is moved downwardly and the plate 158 engages one of the edges 118,120 of camming plate 86. It is necessary that the piston rod be in the position of FIG. 6 when rotating assemblies 80,80' are rotated in either direction in order to provide clearance for the rotation; in other words, rotation of assemblies 80,80' could not take place when the piston rod is in its lowered position for the reason that plate 158 is against one of the edges 118,120 of camming plate 86.

It is desirable to provide a pair of wire straightening combs 160, FIGS. 9-11, and a pair of terminal orienting jaws 180,182, FIG. 5, for the purpose of ensuring that the lead is precisely oriented after rotation.

The combs 160 comprise plates which extend between the internal surfaces 62 of the side plates 42 and are pivoted on the external surface of side plate which is on the right in FIG. 3 to links 164. The links 164 in turn are pivoted to connecting rods 166 which are pivoted to a cross-head 168. The cross-head is on the end of the piston rod 170 of a piston cylinder 172. The cross-head 168 is slidably supported on guide rods 174 which are fixed to a yoke 176 on the cylinder 172.

As shown in FIG. 10, the lead which is held in the conveyor clamp 16 may not be straight but may be curved in one direction or the other from an axially aligned position. When the comb plates 160 are pivoted from the position of FIG. 9 to the position of FIG. 11, the lead will be straightened as the central notch 162 in each comb moves relatively along the portion of the lead which is adjacent to the conveyor clamp. Edge portions of these notches move along the lead and bring it into axial alignment with the conveyor clamp and with the lead rotating assemblies.

The clamping jaws 180,182 are above and below the terminal which has been rotated and are mounted on the ends of piston rods 184,186. These piston rods in turn extend from cylinders 188,190 which are fixed to the static frame. Immediately prior to closure of the conveyor clamp after the terminal has been rotated, these cylinders 188,190 are pressurized so that the jaws move towards each other and grasp the rotated terminal. The jaws in the rotating mechanisms can then be opened and the jaws of the conveyor clamp closed and the terminal will be precisely oriented in a horizontal position.

A suitable control system is provided for the lead making machine including those components thereof which are not shown such as the crimping presses and the insertion apparatus or block loading apparatus. The control system may comprise a computer which functions to pressurize the various pneumatic cylinders described above at the appropriate times in the operating cycle as shown in FIG. 18.

We claim:

1. Apparatus for rotating an electrical lead about its axis through a predetermined angle, the lead having a terminal on its end and being gripped by a conveyor clamp which is on an intermittently indexed conveyor, the apparatus comprising:

frame means in surrounding relationship to the conveyor clamp, first and second lead rotating assemblies, and control means, the rotating assemblies being in alignment with each other and being movable on the frame means in unison between remote positions and proximate positions relative to the conveyor, the rotating assemblies being on each side of the conveyor and in alignment with the conveyor clamp when in their proximate positions, each of the rotating assemblies having a normally open rotating clamp thereon, the rotating assemblies being rotatable about a common axis of rotation which extends normally of the conveyor and through the clamps, the control means being effective sequentially to move the rotating assemblies from their remote positions to their proximate positions at the beginning of a dwell interval of the conveyor, open the conveyor clamp and close the rotating clamps, rotate the rotating assemblies through the predetermined angle, close the conveyor clamp and open the rotating clamps, rotate the lead rotating assemblies back to their original angular orientations, move the rotating assemblies to their remote positions, and index the conveyor whereby, the lead is released by the conveyor clamp, gripped by the rotating clamps, rotated through the predetermined angle, released by the rotating clamps and gripped by the conveyor clamp in its rotated orientation.

2. Apparatus as set forth in claim 1 characterized in that the lead rotating assemblies are first rotated in a first direction through the predetermined angle and are then rotated through the predetermined angle in a second direction.

3. Apparatus as set forth in claim 1 characterized in that each of the lead rotating assemblies has a lead receiving notch which extends inwardly from its periphery and intersects the axis of rotation, the rotating clamps being on the axis of rotation.

4. Apparatus as set forth in claim 1 characterized in that the terminal is on a first side of the conveyor and is adjacent to the conveyor clamp with one of the rotating assemblies located between the conveyor clamp and the terminal, the apparatus having a pair of opposed normally spaced apart terminal orienting jaws which are on opposite sides of the terminal, and the control means is programmed to move the terminal orienting jaws towards each other after initial rotation of the rotating assemblies and prior to closing of the conveyor clamp whereby the terminal is precisely oriented in its rotated position.

5. Apparatus as set forth in claim 4 characterized in that the lead extends from the terminal through the one rotating assembly, through the conveyor clamp, and through the other rotating assembly so that the lead has a free end portion which extends beyond the other rotating assembly, and a first wire comb is provided for moving the free end portion into a position in which it is aligned with the axis of rotation, the wire comb being pivotally mounted on the frame means and having a recess which receives the free end portion, the control means being programmed to move the wire comb along the free end portion of the lead.

6. Apparatus as set forth in claim 5 characterized in that a second wire comb is provided for moving the portion of the lead which is between the conveyor clamp and the terminal into alignment with the axis of rotation, the second wire comb being pivotally mounted on the frame means, and a single actuator is provided for the first and second wire combs.

7. Apparatus as set forth in claim 3 characterized in that each of the lead rotating assemblies comprises a housing assembly, a clamp controller, and housing assembly rotating means, the housing assembly being rotatably supported on the axis of rotation, the rotating clamp being on the housing assembly and having clamping jaws proximate to the axis of rotation, the jaws being movable relatively towards and away from each other between open and closed positions, the clamp controller being mounted on the housing assembly and being movable between a jaws closed position and a jaws open position, the jaws being coupled to the controller whereby upon movement of the controller from its jaws open position to its jaws closed position when the lead is located on the axis of rotation, the lead will be clamped in the jaws, and upon rotation of the housing assembly by the rotating means, the lead will be rotated, and upon movement of the controller to its jaws open position, the lead will be released in a rotated position.

8. Apparatus as set forth in claim 7 characterized in that the main frame means comprises a static main frame and a sub-frame which is movably mounted on the static frame, the first and second lead rotating assemblies being mounted on the sub-frame.

9. Apparatus as set forth in claim 8 characterized in that the lead rotating assemblies are supported on a plurality of rollers which are mounted on the sub-frame and which at least partially surround the axis of rotation.

10. Apparatus as set forth in claim 9 characterized in that the rotating means comprises a rotary actuator which is mounted on the sub-frame, the rotating assemblies have gear teeth on their peripheries which are coupled to the rotary actuator by pinion gears.

11. Apparatus as set forth in claim 7 characterized in that the housing assembly is cylindrical and is supported on a plurality of rollers at spaced locations on its periphery, the rotating clamp comprises a pair of clamping arms which are pivotally mounted on the housing assembly on parallel spaced-apart clamping arm axes, the clamping jaws being on the clamping arms.

12. Apparatus as set forth in claim 11 characterized in that the clamp controller comprises a plate which is mounted on the housing assembly for movement normally of the axis of rotation, the clamping arms and the plate having camming means thereon for moving the clamping arms thereby to open and close the jaws.

* * * * *